（12） United States Patent
Aceves et al.

(10) Patent No.: US 10,082,246 B2
(45) Date of Patent: Sep. 25, 2018

(54) CRYOGENIC PRESSURIZED STORAGE WITH HUMP-REINFORCED VACUUM JACKET

(71) Applicants: LAWRENCE LIVERMORE NATIONAL SECURITY, LLC, Livermore, CA (US); Universidad de Guanajuato, Guanajuato, GTO. (MX)

(72) Inventors: Salvador M. Aceves, Livermore, CA (US); Francisco Espinosa-Loza, Livermore, CA (US); Guillaume Petitpas, Livermore, CA (US); Vernon A. Switzer, Livermore, CA (US); Elias Rigoberto Ledesma-Orozco, Salamanca GTO. (MX); Victor Alfonso Alcantar-Camarena, Salamanca GTO. (MX)

(73) Assignees: Lawrence Livermore National Security, LLC, Livermore, CA (US); UNIVERSIDAD DE GUANAJUATO, Guanajuato GTO (MX)

( * ) Notice: Subject to any disclaimer, the term of this patent is extended or adjusted under 35 U.S.C. 154(b) by 0 days.

(21) Appl. No.: 15/426,507

(22) Filed: Feb. 7, 2017

(65) Prior Publication Data
US 2018/0224064 A1    Aug. 9, 2018

(51) Int. Cl.
*F17C 1/00*      (2006.01)
*F17C 1/02*      (2006.01)
(Continued)

(52) U.S. Cl.
CPC .............. *F17C 1/02* (2013.01); *F17C 1/12* (2013.01); *F17C 13/001* (2013.01);
(Continued)

(58) Field of Classification Search
CPC .. F17C 1/02; F17C 13/001; F17C 1/12; F17C 2260/012; F17C 2203/0391;
(Continued)

(56) References Cited

U.S. PATENT DOCUMENTS

| | | | |
|---|---|---|---|
| 665,349 A * | 1/1901 | Sewall | F17C 3/08 220/560.1 |
| 3,902,941 A | 2/1975 | Withers | |

(Continued)

*Primary Examiner* — Kareen Thomas
(74) *Attorney, Agent, or Firm* — Eddie E. Scott (57) ABSTRACT

A cryogenic hydrogen storage vessel includes an outer vacuum vessel, a reinforcement ring on the outer vacuum vessel, an inner pressure vessel inside of the outer vacuum vessel, and a vacuum space between the outer vacuum vessel and the inner pressure vessel. One embodiment of the cryogenic hydrogen storage vessel includes an outer vacuum vessel; a hump-shaped reinforcement ring on the outer vacuum vessel, the hump-shaped reinforcement ring including an external hump portion that protrudes from the hump-shaped reinforcement ring and an internal recess in the hump-shaped reinforcement ring; an inner pressure vessel inside of the outer vacuum vessel, a vacuum space between the outer vacuum vessel and the inner pressure vessel, and a composite support ring in the vacuum space extending from the hump-shaped reinforcement ring on the outer vacuum vessel to the inner pressure vessel, the composite support ring nested in the recess in the hump-shaped reinforcement ring.

1 Claim, 8 Drawing Sheets

(51) Int. Cl.
*F17C 1/12* (2006.01)
*F17C 13/00* (2006.01)

(52) U.S. Cl.
CPC ..... *F17C 2203/011* (2013.01); *F17C 2203/03* (2013.01); *F17C 2203/0391* (2013.01); *F17C 2203/0646* (2013.01); *F17C 2221/012* (2013.01); *F17C 2260/012* (2013.01)

(58) Field of Classification Search
CPC ............ F17C 2221/012; F17C 2203/03; F17C 2203/0646; F17C 2203/011
USPC ........................................ 220/560.04–560.15
See application file for complete search history.

(56) References Cited

U.S. PATENT DOCUMENTS

| | | | |
|---|---|---|---|
| 4,767,593 A * | 8/1988 | Wedellsborg .......... | G21C 13/04 220/560.03 |
| 6,708,502 B1 | 3/2004 | Aceves et al. | |
| 6,983,611 B2 | 1/2006 | Reese et al. | |
| 7,191,602 B2 | 3/2007 | Berry et al. | |
| 7,219,812 B2 | 5/2007 | Debecker et al. | |
| 2015/0060466 A1* | 3/2015 | Lind ..................... | B60K 15/03 220/560.1 |

* cited by examiner

CRYOGENIC PRESSURIZED STORAGE WITH HUMP-REINFORCED VACUUM JACKET

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to cryogenic pressure vessels and more particularly to a cryogenic pressure vessel with reinforcement.

State of Technology

This section provides background information related to the present disclosure which is not necessarily prior art.

Hydrogen has the potential to displace petroleum as a universal transportation fuel, reducing or eliminating petroleum dependence and associated tailpipe air pollutants and greenhouse gases. The predominant technical barrier limiting widespread use of hydrogen vehicles is sufficient onboard fuel storage capacity for highway vehicles within volume, weight, cost, and refueling time constraints.

Over the past 15 years the inventors have pioneered research and development of a new storage technology: cryogenic pressure vessels (also known as cryo-compressed vessels). This technology can store hydrogen more compactly than conventional ambient temperature pressure vessels, with lower weight than hydrogen absorption storage technologies, and with far greater thermal endurance than conventional low pressure $LH_2$ storage, potentially eliminating venting losses under virtually all automotive usage conditions. Cost is lower due to smaller container size leading to reduced need for expensive structural materials. Cryogenic pressure vessels also have compelling safety advantages due to the lower expansion energy of cryogenic hydrogen and the presence of an outer vacuum jacket that protects the internal high-pressure vessel from environmental or mechanical impact.

Previous research has determined that the outer vacuum jacket is a major contributor to overall cryogenic pressure vessel system weight and volume. Vacuum insulation also contributes to increased system volume due to the need for a vacuum gap of minimum thickness. Vacuum jacket weight can be reduced by manufacture with light materials such as aluminum. However, the potential for buckling caused by ambient pressure sets a lower limit for vacuum jacket thickness (and weight).

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed apparatus, systems, and methods for simultaneously reducing vacuum jacket weight and volume that may potentially improve volumetric (gH2/L) and gravimetric (H2 weight fraction) hydrogen storage performance, thereby contributing to more practical hydrogen fueled vehicles. The inventors have developed hydrogen cryogenic pressure vessel apparatus, systems, and methods that incorporate a hump-shaped reinforcement. This reinforcement simultaneously strengthens the outer vacuum jacket against buckling and reduces system weight and volume. The inventor's hydrogen cryogenic pressure vessel apparatus, systems, and methods, simultaneously reduces weight and volume of the cryogenic vessel system, enabling lighter and more compact hydrogen storage necessary for practical hydrogen-fueled propulsion in automobiles, aircraft, submarines, and other systems in need of high capacity, lightweight hydrogen storage.

One embodiment of the inventor's hydrogen cryogenic pressure vessel apparatus, systems, and methods simultaneously strengthens the outer vacuum jacket against buckling and enables placement of a high pressure vessel ring support within the hump-shaped reinforcement.

The inventor's hydrogen cryogenic pressure vessel apparatus, systems, and methods have use in cryogenic pressurized hydrogen storage vessels for hydrogen powered vehicles where the apparatus, systems, and methods aid in reducing the system volume and weight of the onboard storage vessel of hydrogen fuel. The inventor's hydrogen cryogenic pressure vessel apparatus, systems, and methods is also applicable to hydrogen powered Airplanes, Unmanned Aerial Vehicles, submarines, ships, and any other vehicle that needs compact hydrogen storage with long dormancy.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Figure 1:
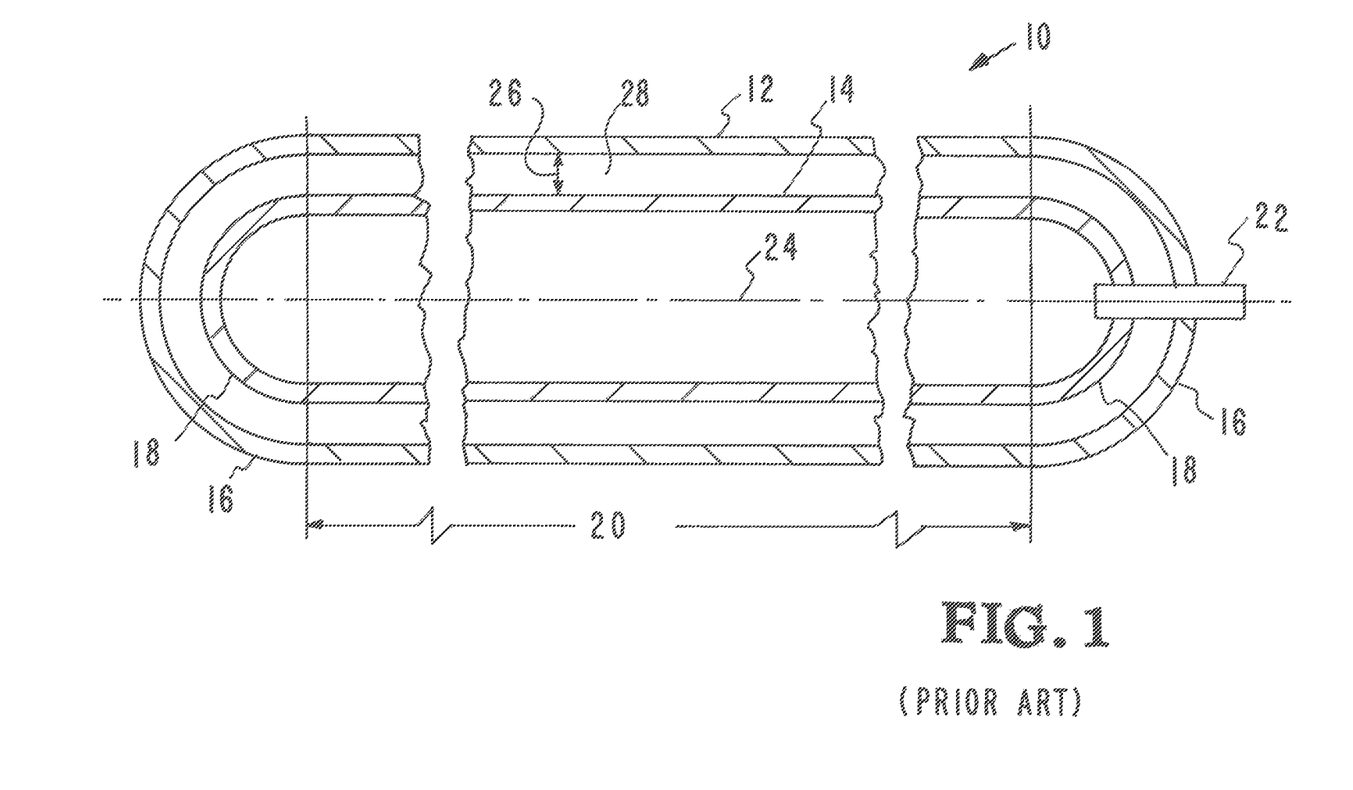
FIG. 1 illustrates a Prior Art cryogenic pressure vessel.

Referring now to the drawings and in particular to FIG. 1, an illustrative cut-away view of a Prior Art cryogenic pressure vessel is shown. The Prior Art cryogenic pressure vessel is designated generally by the reference numeral 10. The following is a list of the components of the Prior Art cryogenic pressure vessel 10 shown in FIG. 1:

outer vacuum vessel 12,
inner pressure vessel 14,
outer vacuum vessel end caps 16,
inner pressure vessel end caps 18,
center section 20,
fill/supply fitting 22,
center line 24,
space 26 between the outer vacuum vessel and the inner pressure vessel, and
vacuum 28 in the space between the outer vacuum vessel and the inner pressure.

Cryogenic pressure vessels (also known as cryo-compressed vessels) have been proposed as an alternative hydrogen storage technology that takes advantage of the high density of cryogenic hydrogen to enable high capacity storage while simultaneously avoiding fuel venting that frequently results from environmental heat transfer. The Prior Art cryogenic pressure vessels 10 includes a high-pressure inner vessel 14 made of carbon-fiber-coated aluminum (similar to those typically used to store compressed gas), a vacuum space 26 filled with numerous sheets of highly reflective plastic, and an outer metallic vacuum jacket 12. Previous research has demonstrated safety, capacity, cost, weight and refuelability advantages for cryogenic pressure vessels vs. alternative hydrogen storage technologies (compressed gas as well as materials-based absorption and adsorption systems).

System hydrogen storage density (grams of hydrogen per total system volume) of cryogenic pressurized storage is critical to practical implementation in future vehicles, as it determines cryogenic vessel capacity for any given available space in the vehicle, and therefore driving range with a full fuel tank.

Although less important for automobiles than capacity, system weight is also an important parameter that contributes to vehicle fuel economy and therefore vehicle driving range. On the other hand, weight is crucial for flying applications, and aircraft (e.g. UAVs) demand minimum system weight.

The inventors have developed a cryogenic hydrogen pressure vessel with reinforcement(s) that can simultaneously improve volumetric (grams of hydrogen per system liter) and gravimetric (hydrogen weight fraction) storage performance, thereby contributing to more practical hydrogen-powered automobiles (aircraft) with longer driving (flying) range. The inventors have developed multiple embodiments of the hydrogen cryogenic pressure vessel with reinforcement.

Consider system weight first. It has been determined by the inventors and others that the vacuum jacket is a major contributor to system weight. Made of stainless steel in previous prototypes for ease of manufacture, the vacuum jacket typically weighs as much as the high-pressure vessel it surrounds. Replacing stainless steel by a light metal such as aluminum contributes somewhat to vacuum jacket weight reduction. This reduction is, however, not as large as could be initially expected. Vacuum jacket thickness (and therefore weight) is controlled by buckling. External ambient pressure may be enough to collapse the vacuum jacket if made too thin, especially when the vacuum jacket is made of light, relatively weak metals such as aluminum.

For example, recent calculations by the inventors have determined that a cryogenic pressure vessel with 80 liters of hydrogen capacity and slender profile with 132.9 cm total outer length and 37 cm outer diameter demands a minimum of 3 mm aluminum thickness to avoid vacuum jacket buckling when using a safety factor of 2.25 (equal to the safety factor required by DOT, ISO, or similar standards for pressure vessel certification). A 3 mm thick aluminum vacuum jacket weighs 13.5 kg—about a quarter of the overall system weight.

Figure 2A:
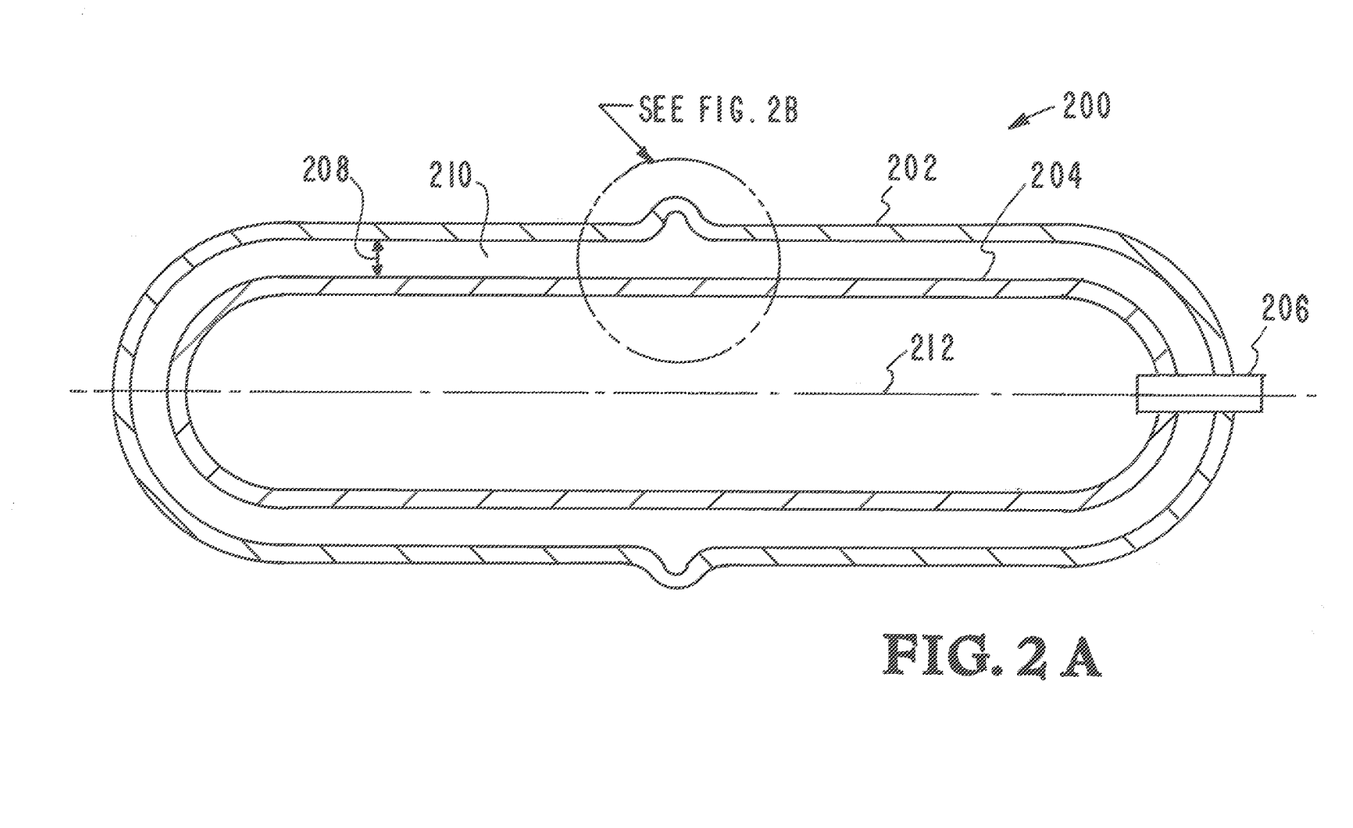
FIGS. 2A and 2B are illustrative cut-away views of a first embodiment of the inventor's cryogenic hydrogen pressure vessel with reinforcement.
Figure 2B:
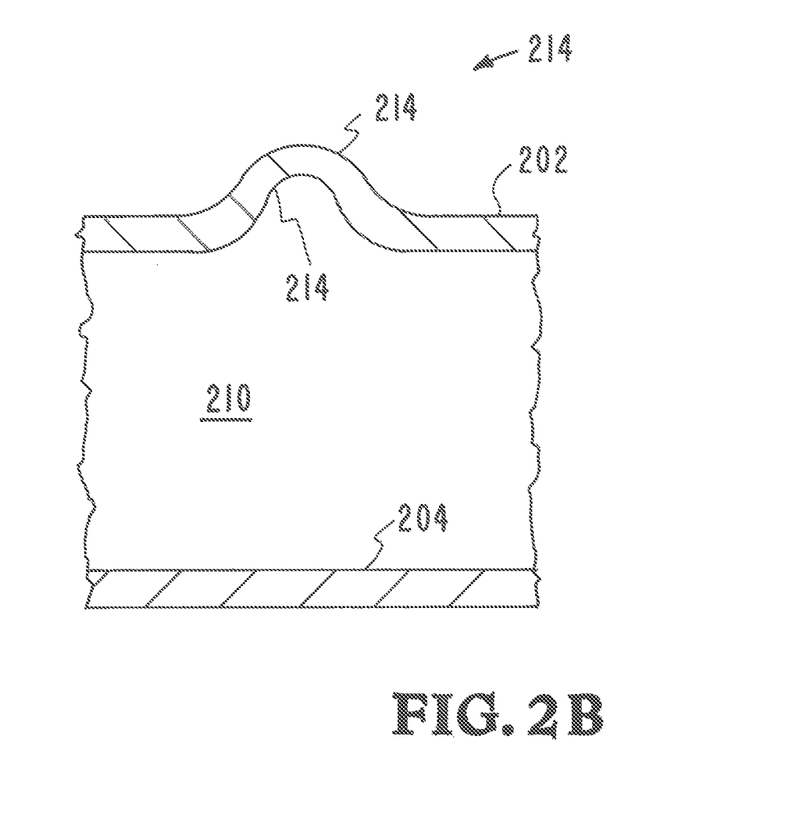

Referring to FIGS. 2A and 2B, an illustrative cut-away view of a first embodiment of the inventor's cryogenic hydrogen pressure vessel with reinforcement is shown. This first embodiment is designated generally by the reference numeral 200. FIG. 2A is an illustrative cut-away view of the first embodiment 200 and FIG. 2b is an enlarged view of a portion of the reinforcement ring shown in FIG. 2A.

Referring to FIG. 2A, the first embodiment 200 is illustrated. The embodiment 200 provides reduce vacuum jacket thickness while avoiding collapse. The following is a list of the components of the first embodiment of the inventor's cryogenic pressure vessel 200:

outer vacuum vessel 202,
inner pressure vessel 204,
fill/supply fitting 206,
space 208 between outer vacuum vessel and inner pressure vessel,
vacuum 210 in space 208,
center line 212, and
hump-shaped reinforcement ring 214.

The first embodiment 200 of the inventor's cryogenic hydrogen pressure vessel includes an outer vacuum vessel 202, a high-pressure inner vessel 204, a space 208 between the outer vacuum vessel 202 and the inner vessel 204 and a vacuum 230 in the space 208. A reinforcement ring 214 extends around the circumference of outer vacuum vessel 202.

Referring now to FIG. 2B, an enlarged view of the hump-shaped reinforcement ring 214 is shown. The hump-shaped reinforcement ring 214 includes a hump portion 214a that provides a rounded protuberance extending above the surface of the outer vacuum vessel 202 and a recess 214b that extends around the internal diameter of the outer vacuum vessel 202. The hump-shaped reinforcement ring 214 projects outward from the surface of the outer vacuum vessel 202 and extends around the circumference of outer vacuum vessel 202. The reinforcement ring 214 is an integral part of the outer vacuum vessel 202. The reinforcement ring 214 is formed in the outer vacuum vessel 202 by a process of rolling the outer vacuum vessel 202 or by other standard manufacturing processes.

Figure 3A:
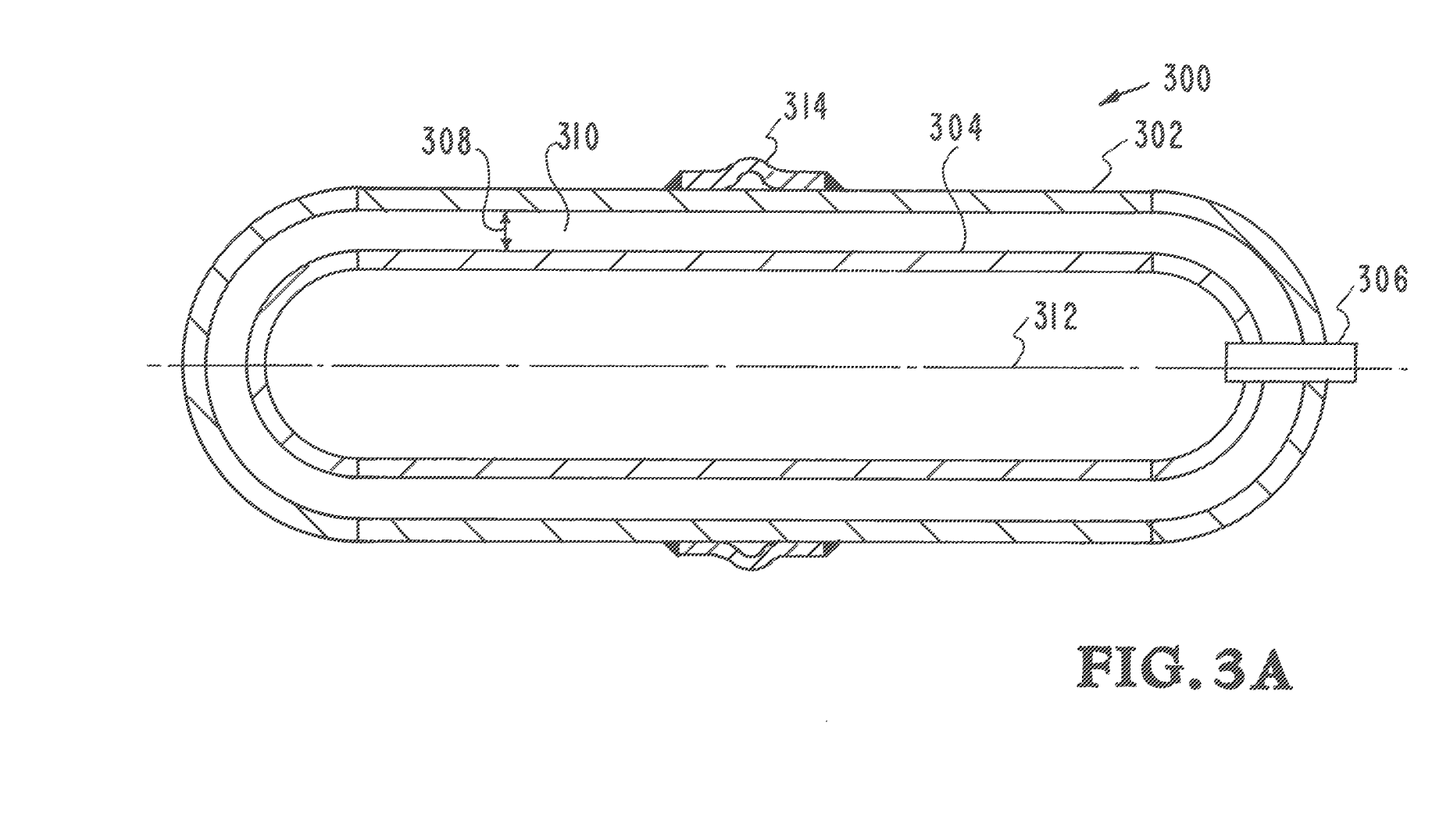
FIGS. 3A, 3B, and 3C are illustrative cut-away views of a second embodiment of the inventor's cryogenic hydrogen pressure vessel with reinforcement.
Figure 3B:
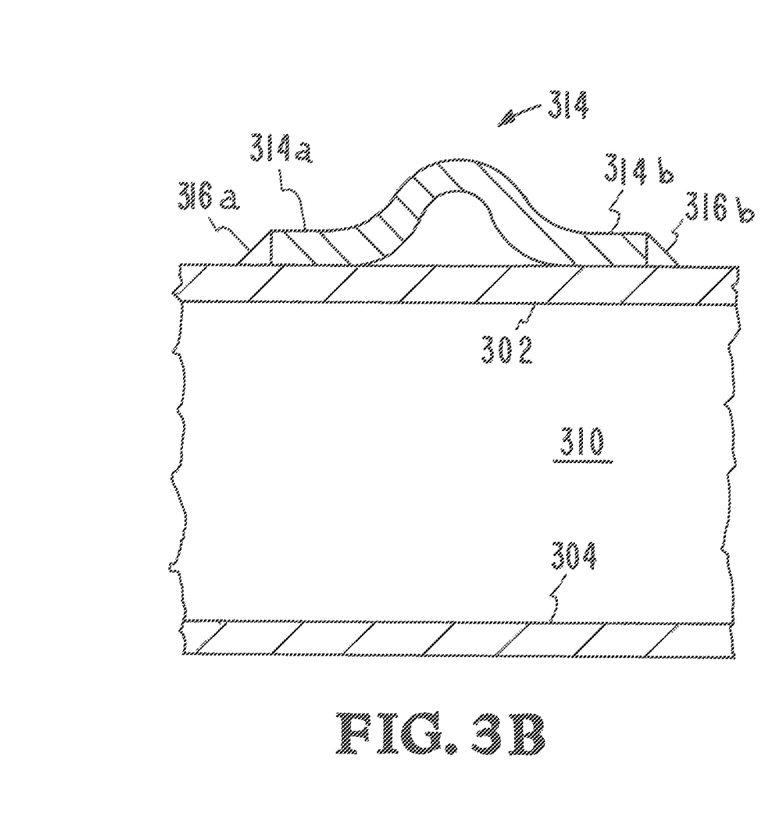
Figure 3C:
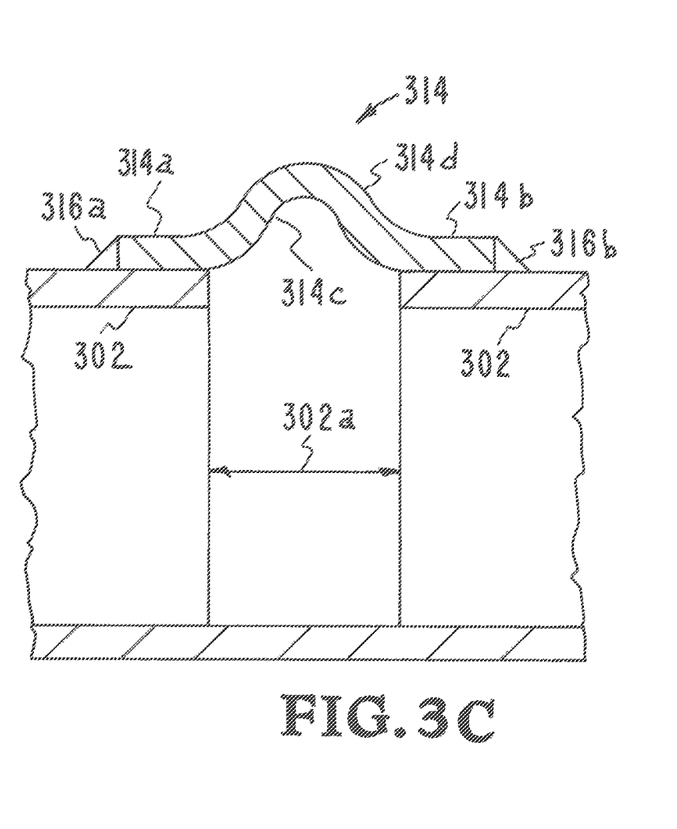

Referring to FIGS. 3A, 3B, and 3C, illustrative cut-away views of a second embodiment of the inventor's cryogenic hydrogen pressure vessel with reinforcement is shown. This second embodiment is designated generally by the reference numeral 300. FIG. 3A is an illustrative cut-away view of the second embodiment 300 and FIGS. 3B and 3C are enlarged views of a portion of the second embodiment 300 shown in FIG. 3A.

Referring to FIG. 3A, the second embodiment 300 is illustrated. The embodiment 300 provides reduced vacuum jacket thickness while avoiding collapse. The following is a list of the components of the second embodiment of the inventor's cryogenic pressure vessel 300:
  outer vacuum vessel 302,
  inner pressure vessel 304,
  fill/supply fitting 306,
  space 308 between outer vacuum vessel and inner pressure vessel,
  vacuum 310 in space 308,
  center line 312, and
  hump-shaped reinforcement ring 314.

The second embodiment 300 of the inventor's cryogenic pressure vessel includes an outer vacuum vessel 302, a high-pressure inner vessel 304, a space 308 between the outer vacuum vessel 302 and the inner vessel 304 and a vacuum 310 in the space 308. A hump-shaped reinforcement ring 314 is welded to the outer vacuum vessel 34.

Referring now to FIG. 3B, an enlarged view of a portion of the hump-shaped reinforcement ring 314 is shown. The hump-shaped reinforcement ring 314 extends around the circumference of the outer vacuum vessel 302. The hump-shaped reinforcement ring 314 includes feet 314a and 314b that are positioned on the outside of the outer vacuum vessel 302. The weld 316a attaches the foot 314a to the outer vacuum vessel 302. The weld 316b attaches the foot 314b to the outer vacuum vessel 302.

The hump-shaped reinforcement ring 314 includes a hump portion that provides a rounded protuberance extending above the surface of the outer vacuum vessel 302 and a recess that extends around the internal diameter of the outer vacuum vessel 302. The hump-shaped reinforcement ring 314 projects outward from the surface of the outer vacuum vessel 302 and extends around the circumference of outer vacuum vessel 302.

Referring now to FIG. 3C, another version of the hump-shaped reinforcement ring 314 is shown. The hump-shaped reinforcement ring 314 extends around the circumference of the outer vacuum vessel 302. The outer vacuum vessel 302 includes a gap 302a. The hump-shaped reinforcement ring 314 extends around the circumference of the outer vacuum vessel 302 and is positioned over the gap 302a.

The hump-shaped reinforcement ring 314 includes feet 314a and 314b that are positioned on the outside of the outer vacuum vessel 302. The weld 316a attaches the foot 314a to the outer vacuum vessel 302. The weld 316b attaches the foot 314b to the outer vacuum vessel 302.

The hump-shaped reinforcement ring 314 includes a hump portion that provides a rounded protuberance 314d extending above the surface of the outer vacuum vessel 302 and a recess 314c that extends around the internal diameter of the outer vacuum vessel 302. The recess 314c is located above the gap 302a in the outer vacuum vessel 302. The hump-shaped reinforcement ring 314 projects outward from the surface of the outer vacuum vessel 302 and extends around the circumference of outer vacuum vessel 302.

Figure 4:
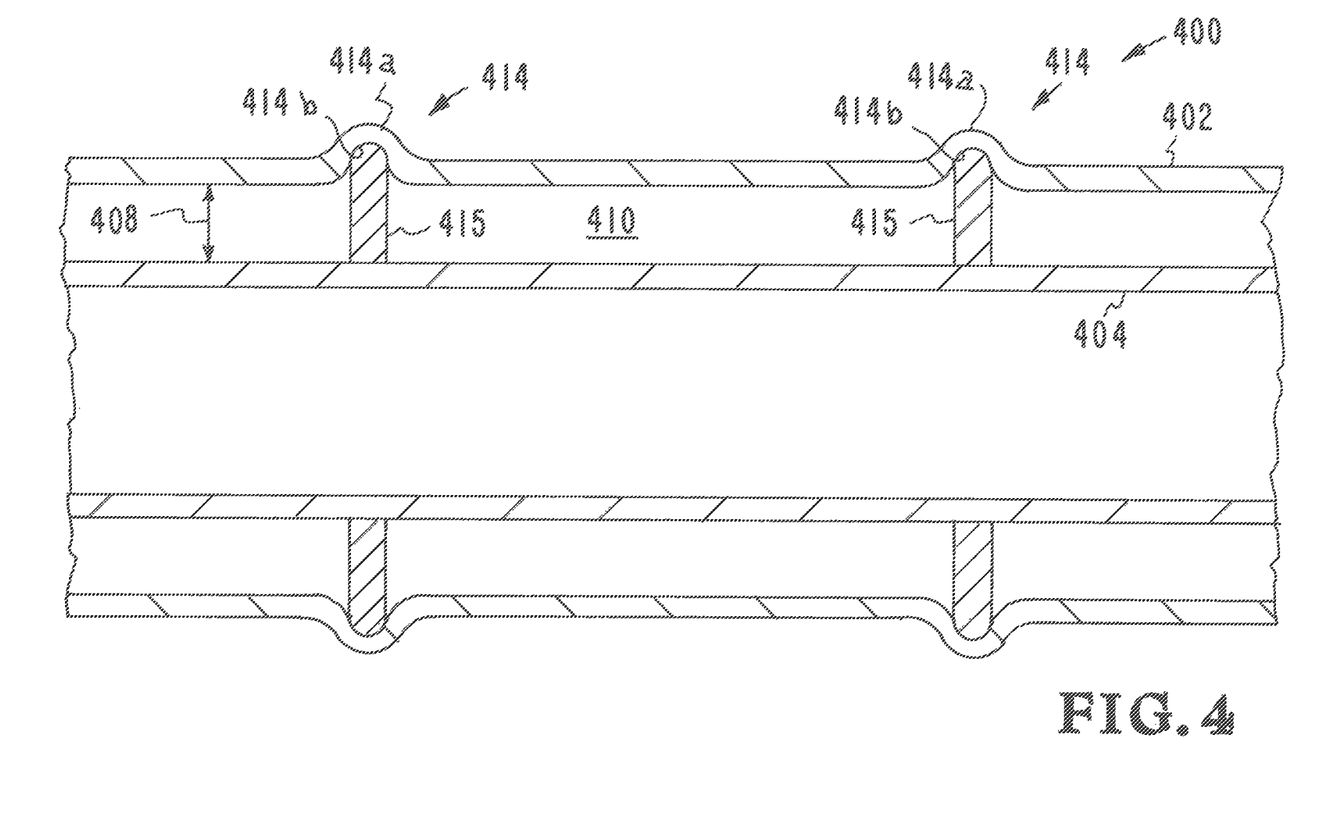
FIG. 4 is an illustrative cut-away views of a third embodiment of the inventor's cryogenic hydrogen pressure vessel with reinforcement.

Referring to FIG. 4, an illustrative cut-away view of a third embodiment of the inventor's cryogenic pressure vessel with reinforcement is shown. This third embodiment is designated generally by the reference numeral 400. The third embodiment 400 is like the first embodiment 200 shown in FIG. 2A; however, the third embodiment 400 includes composite support rings between outer vacuum vessel and inner pressure vessel.

The outer vacuum vessel is subjected to pressure from the atmosphere because of the vacuum in the space between the outer vacuum vessel and the inner pressure vessel. The hump-shaped reinforcement rings strengthen the outer vacuum vessel and enable the outer vacuum vessel to be made of lighter materials and/or thinner than if there was no hump-shaped reinforcement ring.

The inner pressure vessel is subjected to outward pressure from hydrogen stored in the inner pressure vessel. The composite support rings provide mechanical support for the inner vessel through a long thermal path that minimizes heat transfer to the inside.

The following is a list of the components of the third embodiment 400 of the inventor's cryogenic pressure vessel with reinforcement shown in FIG. 4:
  outer vacuum vessel 402,
  inner pressure vessel 404,
  space 408 between outer vacuum vessel and inner pressure vessel,
  vacuum 410 in space 408,
  hump-shaped reinforcement rings 414.
  hump portion 414a,
  recess 414b, and
  composite support rings 415 in the vacuum space 508 between outer vacuum vessel and inner pressure vessel.

As illustrated in FIG. 4, the hump-shaped reinforcement rings 414 are an integral part of the outer vacuum vessel 402. The hump-shaped reinforcement rings 414 are formed in the outer vacuum vessel 402 by a process of rolling the outer vacuum vessel 402 or by other standard manufacturing processes.

The composite support rings 415 are in the vacuum space 408 between outer vacuum vessel 402 and the inner pressure vessel 404. The composite support rings 415 fit within the recess 414 in the hump-shaped reinforcement ring 414 and extend between the hump-shaped reinforcement ring 414 and the inner pressure vessel 404.

The inner pressure vessel 404 is subjected to outward pressure from hydrogen stored in the inner pressure vessel 404. The composite support rings 415 strengthen the inner pressure vessel 404 and enables the inner pressure vessel 404 to be made of lighter materials than if there were no composite support rings.

The outer vacuum vessel 402 is subjected to pressure from the atmosphere because of the vacuum 410 in the space 408 between the outer vacuum vessel and the inner pressure vessel. The hump-shaped reinforcement rings 414 strengthen the outer vacuum vessel 402 and enables the outer vacuum vessel 402 to be made of lighter and/or thinner materials than if there were no hump-shaped reinforcement rings.

Figure 5A:
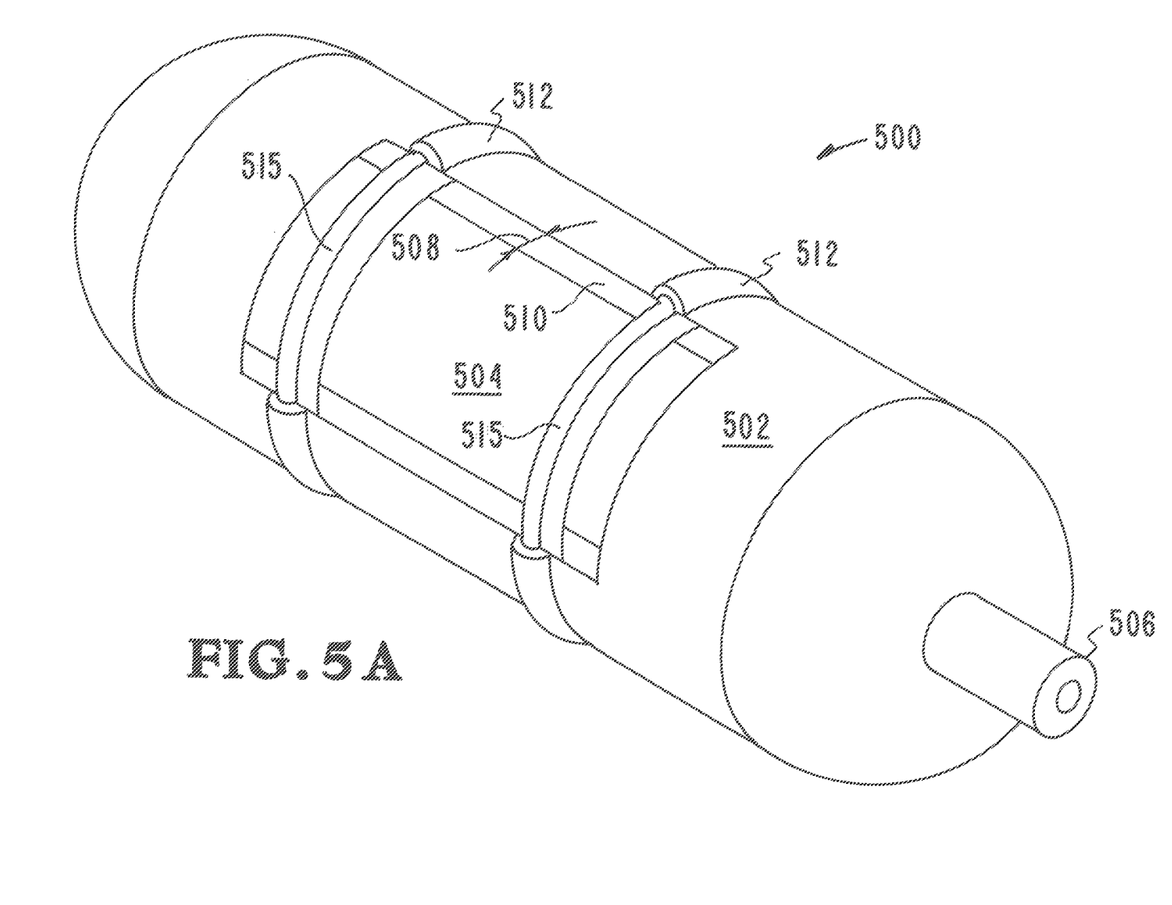
FIGS. 5A and 5B are illustrative cut-away views of a fourth embodiment of the inventor's cryogenic hydrogen pressure vessel with reinforcement.
Figure 5B:
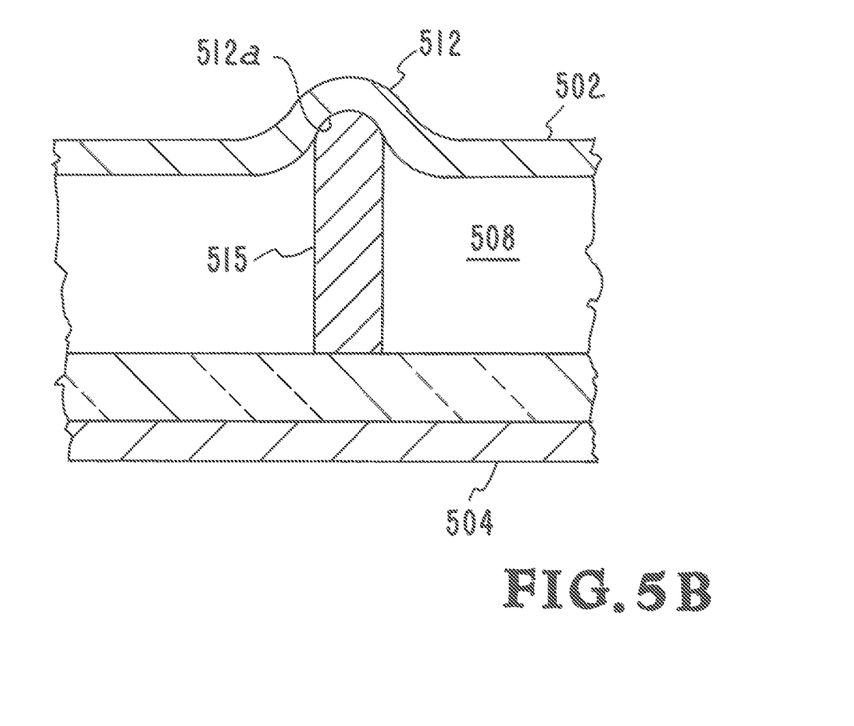

Referring to FIGS. 5A and 5B, an illustrative cut-away view of a fourth embodiment of the inventor's cryogenic hydrogen pressure vessel with reinforcement is shown. This fourth embodiment is designated generally by the reference numeral 500. FIG. 5A is an illustrative cut-away view of the fourth embodiment 500 and FIG. 5b is an enlarged view of a portion of one of the reinforcement rings shown in FIG. 5A.

Referring to FIG. 5A, the fourth embodiment 500 is illustrated. The embodiment 500 provides reduce vacuum jacket thickness while avoiding collapse. The following is a list of the components of the fourth embodiment of the inventor's cryogenic pressure vessel 500:

outer vacuum vessel 502,
inner pressure vessel 504,
fill/supply fitting 506,
vacuum space 508 between outer vacuum vessel and inner pressure vessel,
vacuum 510 in the vacuum space 508 between outer vacuum vessel and inner pressure vessel,
composite support rings 515 in the vacuum space 508 between outer vacuum vessel and inner pressure vessel, and
hump-shaped reinforcement rings 512.

The fourth embodiment 500 of the inventor's cryogenic pressure vessel includes an outer vacuum vessel 502, a high-pressure inner vessel 504, and a vacuum space 508 between the outer vacuum vessel 502 and the inner vessel 504. Composite support rings 515 are in the vacuum space 508 between outer vacuum vessel 502 and the inner pressure vessel 504. The hump-shaped reinforcement rings 514 extend around the circumference of outer vacuum vessel 502.

FIG. 5B shows an enlarged view of one of the hump-shaped reinforcement rings 514 and the composite support ring 515 that are shown in FIG. 5A. The hump-shaped reinforcement ring 514 extends around the circumference of outer vacuum vessel 502. The hump-shaped reinforcement ring 514 is an integral part of the outer vacuum vessel 502. The hump-shaped reinforcement ring 512 is formed in the outer vacuum vessel 502 by a process of rolling the outer vacuum vessel 502 or by other standard manufacturing processes. The hump-shaped reinforcement ring 514 includes a hump portion 514a that provides a rounded protuberance extending above the surface of the outer vacuum vessel 502 and a recess 514b that extends around the internal diameter of the outer vacuum vessel 502. The hump-shaped reinforcement ring 514 projects outward from the surface of the outer vacuum vessel 502 and extends around the circumference of outer vacuum vessel 502.

The composite support ring 515 is in the vacuum space 508 and nests in the recess 514b of the hump-shaped reinforcement ring 514. The composite support ring 515 connects the hump-shaped reinforcement ring 514 with the inner pressure vessel 504 and provides cryogenic support to the inner pressure vessel 504 with reduced heat transfer rate.

Recent calculations by the inventors have determined that a cryogenic pressure vessel with 80 liters of hydrogen capacity and slender profile with 132.9 cm total outer length and 37 cm outer diameter demands a minimum of 3 mm aluminum thickness to avoid vacuum jacket buckling when using a safety factor of 2.25 (equal to the safety factor required by DOT, ISO, or similar standards for pressure vessel certification). A 3 mm thick aluminum vacuum jacket weighs 13.5 kg—about a quarter of the overall system weight.

The composite support rings 510 that maintain the inner pressure vessel suspended within the vacuum jacket for minimizing environmental heat transfer. The composite support rings 510 demand a minimum thickness of 1.5-3 cm to maintain conduction heat transfer at an acceptable level (1 Watt or less). The need for a minimum ring thickness has a large impact on volumetric efficiency of hydrogen storage, since the vacuum gap volume has been between 30 and 60% of the hydrogen volume in previous cryogenic vessels. It is therefore synergistic to locate the support ring within the hump reinforcement for increasing the thickness of the support ring (and thereby reducing heat transfer) while reducing impact on outer volume.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A cryogenic hydrogen storage vessel apparatus, comprising:
   an outer vacuum vessel;
   a reinforcement ring on said outer vacuum vessel, wherein said reinforcement ring includes a hump portion that protrudes outward from said outer vacuum vessel and a recess within said outer vacuum vessel;
   an inner pressure vessel inside of said outer vacuum vessel;
   a vacuum space between said outer vacuum vessel and said inner pressure vessel; and
   a composite support ring in said vacuum space wherein said composite support ring is located in said recess within said outer vacuum vessel and extends from said reinforcement ring on said outer vacuum vessel to said inner pressure vessel.

* * * * *